US 6,515,539 B1

(12) United States Patent
Levanon et al.

(10) Patent No.: US 6,515,539 B1
(45) Date of Patent: Feb. 4, 2003

(54) MICROWAVE DEVICES BASED ON CHEMICALLY INDUCED DYNAMIC ELECTRON SPIN POLARIZATION

(75) Inventors: Haim Levanon, Mavasseret Zion (IL); Aharon Blank, Kiryat (IL)

(73) Assignee: Yissum Research Development Company of The Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 09/548,012

(22) Filed: Apr. 12, 2000

(51) Int. Cl.$^7$ .................................................. H01S 1/00

(52) U.S. Cl. ........................ 330/4; 333/17.2; 333/156

(58) Field of Search ............................ 330/4; 331/94.1; 333/156, 17.2

(56) References Cited

U.S. PATENT DOCUMENTS

| | | |
|---|---|---|
| 3,210,674 A | 10/1965 | Hughes |
| 3,223,932 A | 12/1965 | Levy |
| 3,350,632 A | 10/1967 | Robinson |
| 3,403,349 A | 9/1968 | Wieder |
| 3,454,885 A | 7/1969 | Anderson |
| 3,678,400 A | 7/1972 | Holton |
| 3,720,882 A | 3/1973 | Tang et al. |
| 3,736,518 A | 5/1973 | Anderson et al. |
| 4,161,436 A | 7/1979 | Gould |
| 4,704,583 A | 11/1987 | Gould |
| 4,755,764 A | 7/1988 | Rosenberg et al. |
| 5,291,145 A | 3/1994 | Yajima et al. |
| 5,424,551 A | 6/1995 | Callahan |
| 5,847,618 A | 12/1998 | Busca et al. |

OTHER PUBLICATIONS

*Exploring New Active Materials for Low–Noise Room–Temperature Microwave Amplifiers and Other Devices*, Aharon Blank, Raphael, Kastner and Haim Levanon, IEEE Transactions on Microwave Theory an Techniques, vol. 46, No. 12, Dec. 1998.

The Interaction between Polarized Triplets and Stable Radicals in Liquid Solutions, Aharon Blank and Haim Levanon, The Hebrew University of Jerusalem, 91904, Israel, Feb. 13, 2001, Revised Version.

A Novel Radical–Triplet Pair Mechanism For Chemically Induced Electron Polarization (CIDEP) of Free Radicals in Solution, C. Blättler, F. Jent and H. Paul, Dec. 6, 1989.

Triplet Radical Interaction. Direct Measurement of Triplet Polarization Transfer by Fourier Transport Electron Paramagnetic Resonance, Aharon Blank and Haim Levanon, The Hebrewe University of Jerusalem., 91904, Isreal, Oct. 19, 1999.

X–Band Ultralow–Noise Maser Amplifier Performance, G.W. Glass and G.G. Ortiz, Radio Frequency and Microwave Subsystems Section, D.L. Johnson, Applied Mechanics Technologies Section, TDA Progress Report 42–116, Feb. 15, 1994.

Optical Pumping Microwave Masers, H. Hsu, Senior Member, Ire and F.K. Tittell, Jan. 1963 pp. 185–189.

(List continued on next page.)

*Primary Examiner*—Benny T. Lee
(74) *Attorney, Agent, or Firm*—Barnes & Thornburg

(57) ABSTRACT

Optically pumped masers are described. The devices are useful for microwave amplification, microwave phase shifting and microwave limiting function. The devices are based on electron spin polarization of a stable free radical species induced by an intermolecular energy transfer process acting via a photo induced radical-triplet pair mechanism. A paramagnetic triplet precursor chromophore in a matrix with the stable free radical species is irradiated, preferably using a pulsed laser to initiate the process with concomitant increase in matrix magnetic susceptibility. Microwave radiation incident on the photo activated matrix is reflected as amplified, phase shifted or limited microwave fields dependent on relevant device parameters and on the power of the incident microwave radiation.

31 Claims, 5 Drawing Sheets

OTHER PUBLICATIONS

Chemically Induced Magnetic Polarization, Proceedings of the NATO Advanced Study Institute held at Sogesta, Urbino, Italy; Apr. 17–30, 1977; Edited by L.T. Muus, P.W. Atkins, K.A. McLauchlan, J.B. Petersen.

Solid–State Optically Pumped Microwave Masers, Edward S. Sabisky, Member, IEEE, and C.H. Anerson, IEEE Journal of Quantum Electronics, vol. QE–3, No. 7, Jul. 1967.

The relaxation mechanism of net CIDEP generation in triplet–radical quenching, A.I. Shushin, Institute of Chemical Physics, Academy of Sciences, GSP–1, Ulitsa Kosygina–4, Moscow 117977, Russian Federation, vol. 208, No., 3, 4, Jun. 11, 1993.

The Parkes Radio Telescope Modified for Rapid Receiver Changes, Bruce MacA Thomas, Jeffrety T. Schafer, Malcolm W. Sinclair, Michael J. Kesteven, Peter J. Hall, IEEE Antennas and Propagation Magazine, vol. 39, No. 2, Apr. 1997.

Molecular Amplification and Generation of Microwaves, James P. Wittke, Proceedings of the IEEE, vol. 85, No. 7, Jul., 1997.

A

B

C

D

MICROWAVE DEVICES BASED ON CHEMICALLY INDUCED DYNAMIC ELECTRON SPIN POLARIZATION

FIELD OF THE INVENTION

This invention relates to device capable of interacting with and modifying at least one characteristic of incident microwave radiation. More particularly this invention is directed to an optically pumped multi-component chemical system capable of producing high electron spin polarization at room temperature and the use of such system in maser construction.

BACKGROUND OF THE INVENTION

This invention relates to the use of a special class of chemical systems, which, upon light excitation in an external magnetic field, significantly change their magnetic permeability in the microwave region. The invention makes possible the construction of new classes of microwave devices, including ultra low noise microwave amplifiers, phase shifters with very low losses and electromagnetic devices for the protection of sensitive receivers from strong microwave pulses.

The generation of high controllable magnetic permeability in paramagnetic materials was long ago recognized as being important for variety of microwave devices (Wittke). The original treatment of Wittke dealt with the change in the electron spin population of the Zeeman levels as a mean to perturb the electromagnetic (EM) radiation in the matter, mainly to amplify it. The population difference in the Zeeman levels ($\Delta N$) can be related directly to the material's magnetic permeability, which is more naturally used in relation to various EM applications by the following expressions:

The magnetic permeability is defined in cgs units by:

$$\mu = 1 = 4\pi\kappa \tag{1}$$

where $\kappa = \chi/\rho$ is the volume magnetic susceptibility $\chi$ is the mass magnetic susceptibility per gram, and $\rho$ is the material density. It is also known that for a magnetic transition in $2S+1$ energy levels of a spin system (McMillian):

$$P(m_S) = \Delta N \cdot h\nu \cdot \rho(m_S) = \Delta N \cdot h\nu \cdot (\pi/4)\gamma^2 H_1^2 (S+m_S)(S-m_S+1) f(\nu - \nu_0) \tag{2}$$

where $P(m_s)$ is the power absorbed by spin system ($m_{S-1}$ to $m_S$), $\nu$ is the microwave frequency, $\gamma$ is the electron gyromagnetic ratio, $H_1$ is the magnetic part of the microwave field, $f(\nu-\nu_0)$ is the normalized absorption/emission line shape function, which depends on the frequency $\nu$ and attains its maximum at $\nu_0$ and $\rho(m_S)$ is the probability of transition per time unit. The power at frequency $\nu$, absorbed by a magnetic system with an imaginary part of the volume magnetic susceptibility, $\kappa''$, which is the physical parameter important for practical applications is:

$$P(m_s) = \pi \nu \kappa'' H_1^2 \tag{3}$$

This expression can be either positive or negative, depending on the sign of $\kappa''$, implying the ability to absorb or amplify microwave radiation. Thus, in terms of eq. 2, $\kappa''$ is expressed as a function of $\Delta N$ between the magnetic levels:

$$\kappa'' = \frac{\Delta N}{4} \cdot h\gamma^2 (S+m_s) \cdot (S-m_s+1) f(\nu-\nu_0) \tag{4}$$

The permeability ($\mu$) of common paramagnetic systems is very close to unity, implying that $\kappa'' \sim 0$, with a negligible effect due to microwave excitation. For applied and practical purposes, $\kappa''$ must be of the order of 0.001–0.01 in the microwave frequencies relevant for the present applications as determined by the external magnetic field. These values ensure that for applications such as phase shifters or microwave amplifiers, the change in the microwave power, i.e., absorption or emission (cf eq. 2) due to interaction with the paramagnetic material is large enough. For example, in the case of the microwave amplifier, the amplification due to $\kappa''$, must be much larger than the dielectric losses in the material which always exist. The "threshold values" for $\kappa''$ listed above, depend upon the specific microwave structure in which the material is inserted and the material dielectric properties. The values of $\kappa''$ (0.01–0.001) are typical representative figures known for microwave amplifiers (Yariv) which are similar to the measured and calculated values of the present systems (see below).

Since paramagnetic materials at room temperature have relatively very low magnetic permeability ($\Delta N$ is very small), they can not be exploited for practical purposes. Thus one must either go to very low temperatures, or use some pumping mechanism to increase the population difference in the magnetic levels, and by that, to increase the magnetic permeability. The solid state microwave masers, which were common in the 1950's and 1960's used both cooling and microwave pumping to achieve relatively high permeability (Orton et al). These masers can operate only at very low temperatures, typically in the order of 2 K (−271° C.) or even less, a restriction that precluded a widespread use of these devices as amplifiers. In the 1970's, a new type of solid state amplifier based on the field effect transistor (FET), followed in the 1980's by the high electron mobility transistor (HEMT) appeared. Amplifiers based on these transistors can operate at cryogenic temperatures with similar noise performance achieved by solid state maser amplifiers, at least up to frequencies of several GHz. With these transistors, and the improved technology of solid state electronics, masers were gradually removed from the scene. However, it is important to note that even today, masers are used in some specific applications where noise performance is crucial, such as radio astronomy (Glass) and in astronomic radars (for example, the Arecibo Planetary Radar for radio astronomy).

The restriction of low temperature operation in the solid state masers of the 1960's was mainly due to two reasons. First, the pumping mechanism was in the microwave region. Thus, in order to create high population inversion, $k_b T$ (Boltzmann constant multiplied by the temperature) must be as small as possible, compared to $h\nu$ (Planck constant multiplied by the frequency of radiation). The second reason was that the solid state materials, which were used as the active material in the masers, have very steep dependence of the spin relaxation time of the magnetic levels upon temperature. Thus at higher temperatures, the fast relaxation can not permit efficient pumping of the magnetic levels, and the population of the levels does not change much. Using optical excitation to pump the magnetic levels can solve the first problem. These are called solid state optically pumped masers (Anderson et al U.S. Pat. No. 3,736,518). With optical excitation one can, in principle, operate the maser at higher temperatures, as the pumping is done with a much larger $h\nu$. However, again, the second constrain of short relaxation time of the magnetic levels begins to be of importance and the improvement in the temperature of operation is very small (operation in about 10 K instead of 2 K).

In parallel to these efforts, in the 1960's and 1970's, there were some new discoveries which showed how one can produce high population inversion in paramagnetic materials by chemically induced process, named CIDEP (chemically induced dynamic electron polarization (Muus et al)). These processes were related to the production of paramagnetic species in chemical reactions with non-Boltzmann spin populations, known as electron spin polarization. Although the initial discoveries were made in relation to non-reversible chemical reactions, later studies demonstrated this phenomenon in photophysical reversible light induced processes. In the late 1980's, a new observation of electron spin polarization generated through the interaction of photoexcited triplets and stable radicals in solution. This reversible physical process is called RTPM (radical triplet pair mechanism) and results in very high population inversion in the stable radical (Blättler et al). The reversibility of the process and the ability to control the radical polarization by means of solution viscosity and type of triplet used, makes this mechanism very attractive in terms of practical application. This is the mechanism on which we base our inventions. The RTPM, in contrast to all previous attempts to generate optically pumped masers, including our previous efforts (Blank et al), is a reversible, photoinduced, intermolecular process. This gives it a substantial lead over all previous intramolecular (such as optically pumping, and, intramolecular intersystem crossing of the $C_{60}$ molecule (Blank et al.)). By employing intermolecular process, one can have very strong control over the dynamics (magnitude of magnetization) and kinetics (the magnetization time dependency) by changing one or two of the pair of molecules involved (radical and triplet) and by changing the solvent properties, such as viscosity. Such control is not possible in intramolecular processes, where to change things, one must change the quantum mechanical properties of the molecular systems, a task which is difficult and out of our current interest. Currently, there are several theoretical treatments, which can provide fairly good prediction of the radical's polarization and the total magnetization as function of the radical and triplet concentrations, as well as the solvent properties. These calculations involve the solution of the appropriate quantum mechanical equations and calculations of the reaction kinetics (described in Shushin's and in Blank's and Levanon's papers in the professional journals). These theoretical predictions enable us to determine which radical and chromophores should be chosen and what solvents should be used to optimize the process of magnetization. The chemical systems chosen for this project will be described below.

SUMMARY OF THE INVENTION

In one embodiment of the invention there is provided an apparatus for modifying a microwave signal either by amplifying it, by shifting its phase or by limiting it above certain power levels. The apparatus comprises a dielectric shielded cavity having at least one light aperture and a wave guide element for directing microwave signals to and from the cavity. The apparatus further comprises a spin polarization matrix in the shielded cavity. The matrix itself comprises a stable free radical species and a light-induced chromophore, which are in communication through energy transfer. The stable free radical species can be in a crystalline matrix comprising the chromophore, or the stable free radical species and the chromophore can be combined, preferably in substantially equimolar amounts, in an optically transparent fluid medium which itself can comprise an organic solvent, a solvent miscible oil or a liquid crystal polymer composition. The spin polarization matrix is typically purged of oxygen and sealed in a dielectric optically transparent container, for example, a quartz vessel which is then located in shielded cavity.

The apparatus further comprises two additional elements critical for device function: a magnet for applying a substantially homogeneous magnetic field to the spin polarization matrix in the shielded cavity and a light source for radiating the matrix through the light aperture in the cavity to generate paramagnetic triplets from the chromophore component of the matrix. The magnet can either be a permanent magnet or an electromagnet or a combination of permanent and electro magnets, and can optionally include a probe for monitoring the magnetic field in the cavity.

The light source is preferably a source of visible light, and in one preferred embodiment it is a laser emitting light at a wave length optimally absorbed by the chromophore for efficient paramagnetic triplet formation. The light source is preferably a pulsed laser although the system can be adapted to continuous wave operation. Pulsed laser sources should have a power capacity such that the number of photons in each pulse is at least equivalent to the number of chromophore species in the matrix.

The invention may best be understood by referring to the following detailed description and accompanying drawings which illustrate the invention. In the drawings.

DETAILED DESCRIPTION OF THE INVENTION

Figure 1:
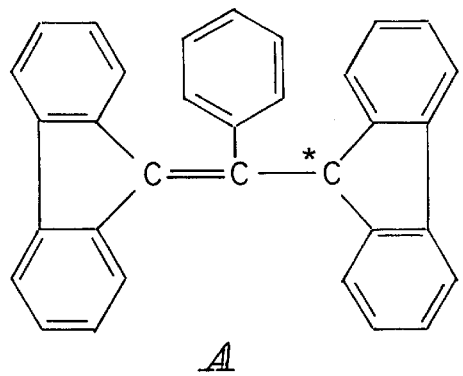
FIG. 1 illustrates some of the materials involved in the chemical systems for high magnetization generation, including stable radicals A: BDPA, B: trityl, C: galvinoxyl, and D: chromophore triplet, H2TPP.
Figure 1:
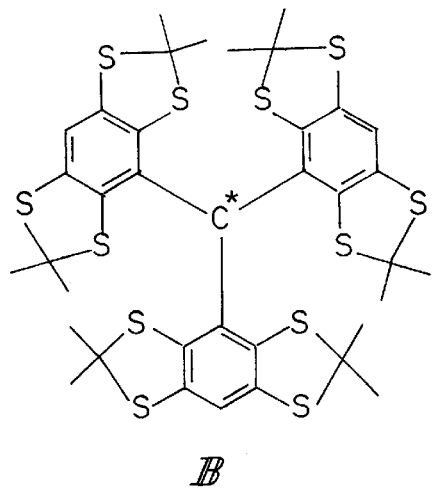
Figure 1:
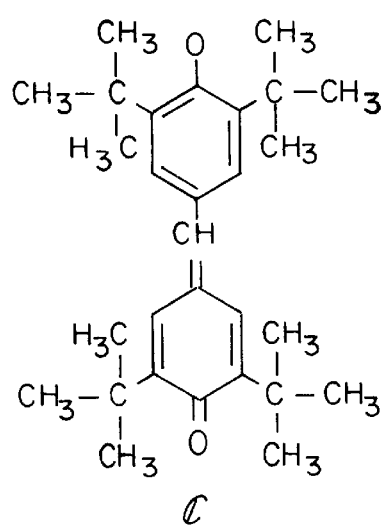
Figure 1:
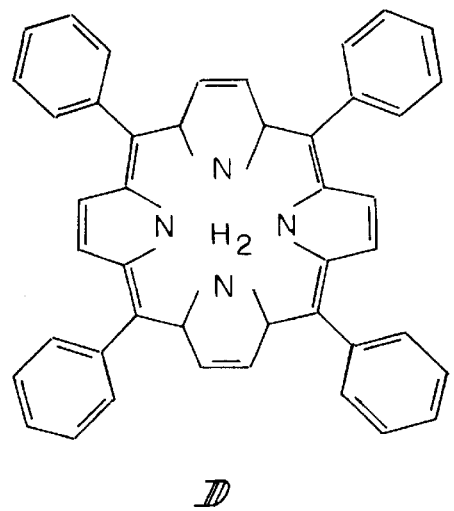

The invention is related to the use of the photoinduced chemical systems, which produce high magnetic permeability, by the RTPM discussed above. The initial step for the generation of the above mentioned applications is the preparation of chemical matrix system preparation. The chemical system includes a stable radical species and a chromophore (a molecule that absorbs visible light efficiently and generates photoexcited triplets with high yield) and a stable radical. Examples of chromophores useful in the present device, are $H_2TPP$ (free base tetraphenyl-porphyrin) and etioporphyrin I. However, any molecule with similar optical/electronic characteristics can be used.. The stable radical species is placed with the chromophore in the same solution (fluid medium) or embedded in a solid crystal of the chromophore. The nature of the specific radical species will determine the instantaneous bandwidth of operation of the device. In the radical galvinoxyl (2,6-di-tert-butyl-α-(3,5-di-tert-butyl-4-oxo-2,5-cyclohexadien-1-ylidene)-p-tolyloxy) [See FIG. 1], a bandwidth of ~10 MHz is obtained, while when BDPA (α,γ-bisdiphenylene-β-phenylallyl) is used, a bandwidth of ~3 MHz is obtained, and in trityl, a bandwidth of less than 1 MHz is obtained (FIG. 1). A large bandwidth leads to lower permeability and therefore decreases the device performance in terms of amplification, phase shifting, etc. However, bandwidth, which is too small, will be useless for most microwave applications.

The solvent properties are also very important to the overall device performance. Experimentally viscous solvents such as combination of dichloromethane and 80% paraffin oil have been used. Laser excitation of a sample in a high viscosity solvent at room temperatures produces a magnetization, which lasts for a long time. The spin polarization matrix solution of the radical and the triplet precursor chromophore must be degassed to remove the oxygen (Blank et al). In general, oxygen quickly quenches the photoinduced triplets.

Figure 2A:
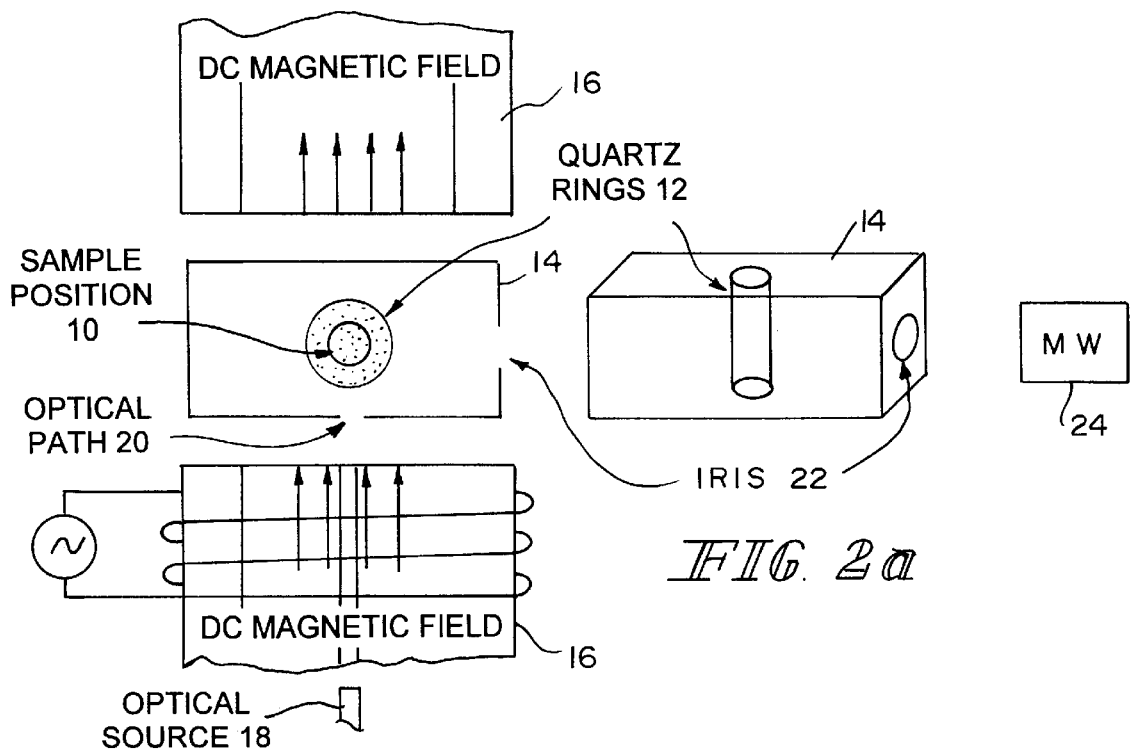
FIGS. 2a, 2b illustrate reflection cavities which are basic building blocks for the amplifier, phase shifter and ELD.
Figure 2B:
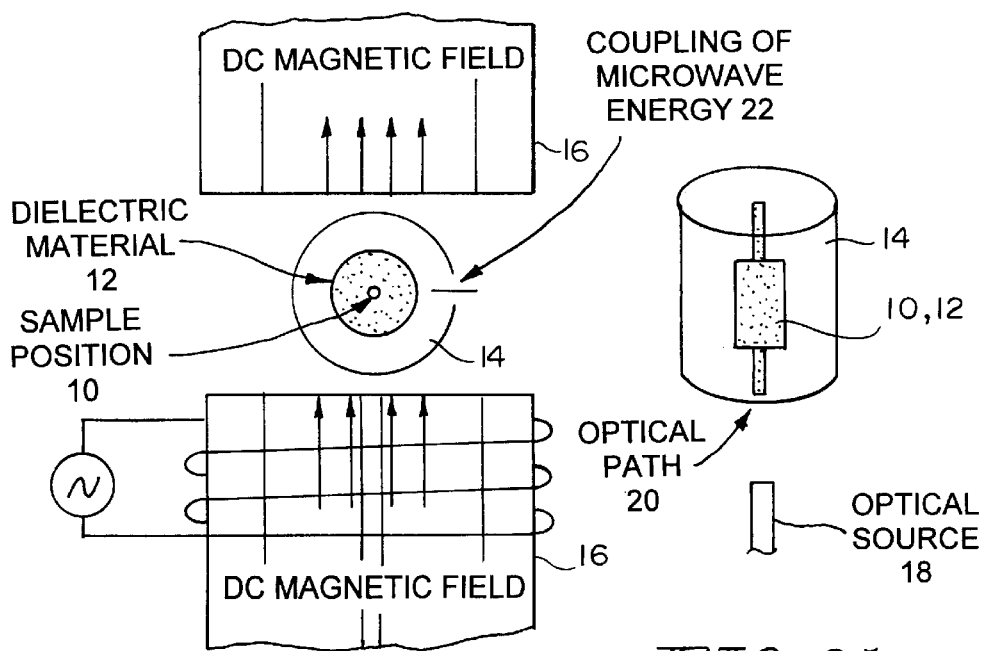
Figure 5:
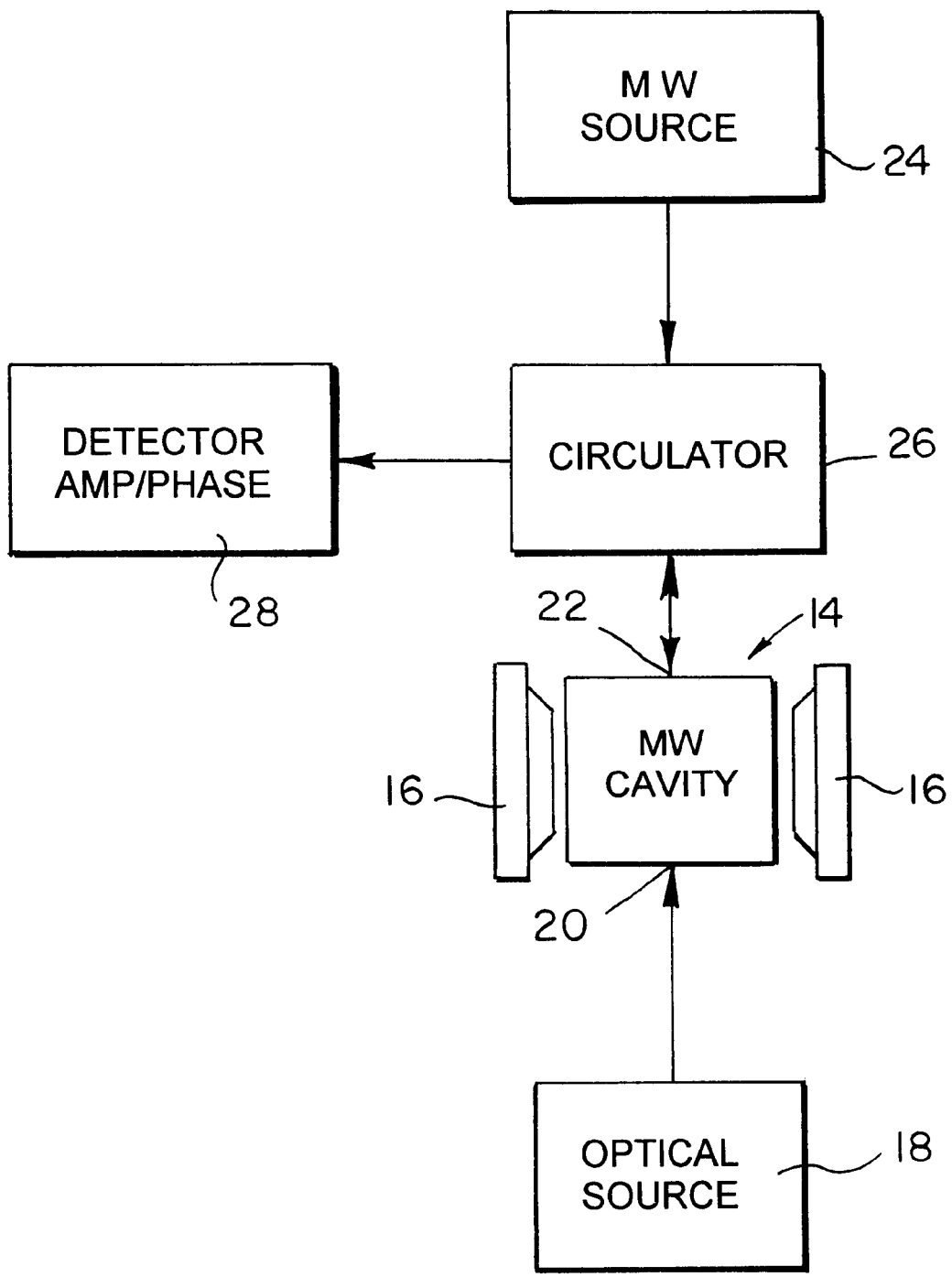
FIG. 5 illustrates a schematic of a microwave amplifier and/or phase shifter.

The degassed matrix 10 is placed in a quartz tube 12, sealed under vacuum and placed in a microwave cavity 14 for microwave transmission and communication (FIGS. 2a and 2b). This microwave cavity 14 is the basic building block for all the applications mentioned, and its structure is designed to minimize dielectric losses while allowing maximum exposure of the natrix volume to photoexcitation. In one example, the cavity is a simple $TE_{102}$ rectangular cavity 14 including dielectric quartz rings 12, as shown in FIG. 2a. In the example illustrated in sectional plan view and phantom perspective view in FIG. 2a, the magnetic field emanates from a pole or poles of a permanent magnet and/or an electromagnet 16 at the bottom in the sectional plan view and reenters the magnet at a pole or poles of the permanent magnet and/or electromagnet 16 at the top in the sectional plan view of FIG. 2a. An optical pump or source 18 is also illustrated diagrammatically. In another example, the cavity 14 is a dielectric cavity as shown in FIG. 2b. In the example illustrated in sectional plan view and phantom perspective view in FIG. 2b, the magnetic field emanates from a pole or poles of a permanent magnet and/or an electromagnet 16 at the bottom in the sectional plan view and reenters the magnet at a pole or poles of the permanent magnet and/or electromagnet 16 at the top in the sectional plan view of FIG. 2b. An optical pump or source 18 is also illustrated diagrammatically. Light from optical source 18 travels the optical path 20, and microwave energy from microwave generator 24 is coupled through iris 22 as depicted in FIGS. 2a, 2b and 5. The low dielectric losses are achieved by enforcing the electrical boundary conditions in the cavity to obtain minimum interference of the electric field at the matrix sample. In addition, the cavity 14 is configured to maximize magnetic field magnitude and homogeneity at the spin polarization matrix.

The two different designs shown in FIG. 2 differ in the volume of the matrix that can be employed, which is related to the saturation power of the device, and in the filling factor of the matrix and in the expected quality factor, Q (see below). In the rectangular cavity design, one can employ a larger matrix volume, thus, increasing the maximum microwave power of saturation of the device. In addition, the electric fields in the vicinity of the matrix are very small, thus sample dielectric losses are negligible and high Q values can be achieved in such device. However, the filling factor (Feher) of the matrix in the cavity can only be ~0.1. The sample is surrounded by quartz rings which increase the magnetic fields in the vicinity of the active material, without substantial dielectric losses.

The dielectric cavity is of a different design. The dielectric material used has very high dielectric constant (~36), with very low losses (the imaginary part of the permittivity, $\epsilon''/\epsilon'$ tan $\delta$~0.0001). When the matrix material is placed in this cavity, it has larger filling factor (~0.5) but can sustain smaller amount of active matrix material and may have lower Q due to the strong electric fields which exist in the sample in the dielectric cavity mode of operation. Both cavity structures must permit photoexcitation of the matrix efficiently through light apertures in the dielectric cavity. Other types of microwave structures with similar properties can also be used. For example, slow wave structure, which is composed of long waveguide with periodic obstacles along it, which efficiently slows the group velocity of the wave (used for traveling wave maser (Orton et al)).

The RTPM process, as stated above, is the basic process we exploit for the magnetization generation. It requires the existence of triplets and free radicals in the same matrix. The process is initiated by generating photoinduced triplets from the chromophore in the matrix (solution). This is preferably carried out by short pulse illumination with visible light. The light pulse must contain enough photons at the appropriate wavelength to excite the entire amount of the chromophores in the solution. This factor limits the concentration of triplets and radicals in the solution. For example, in a 2 mm inner diameter and 0.5 cm length quartz tube, a maximum value of light intensity of ~10 mJ/pulse in 10 Hz repetition rate (green light 532 nm) can be used without sample destruction. This corresponds to $2.5 \times 10^{16}$ photons in every pulse. Thus the chromophore concentration should thus be in the order of ~2 mM for efficient triplet generation. This number is calculated assuming that there should be at least one chromophore in the sample volume for every photon. Further, radical species concentration should be substantially equal to the triplet concentration for efficient process.

The magnetic field source, illustrated in FIG. 2, can be that generated by a large electromagnet, or a permanent magnet. An electromagnet has the advantage that the magnetic field, and thus, the frequency of operation of the device, can be controlled and changed. Permanent magnets (strong rare earth magnets such as NdFe 45) are much more compact, but force the system into a single frequency of operation (within the bandwidth of the radical line as discussed above). One can also combine a permanent magnet with a small electromagnet to have some control and flexibility in the operating frequency of the device. The magnetic field should be substantially homogeneous over the entire sample volume. The amount of homogeneity should be in the order of the bandwidth of operation, or better. Thus, for example, a use of a radical with line width of 1 MHz corresponds to 0.35 Gauss. Namely, in an X-band device which operates under DC field of 3500 Gauss, a homogeneity of 0.35 Gauss is required that corresponds to about 100 ppm or less. Such an homogeneity can be achieved by both permanent magnets and electromagnets.

Figure 3:
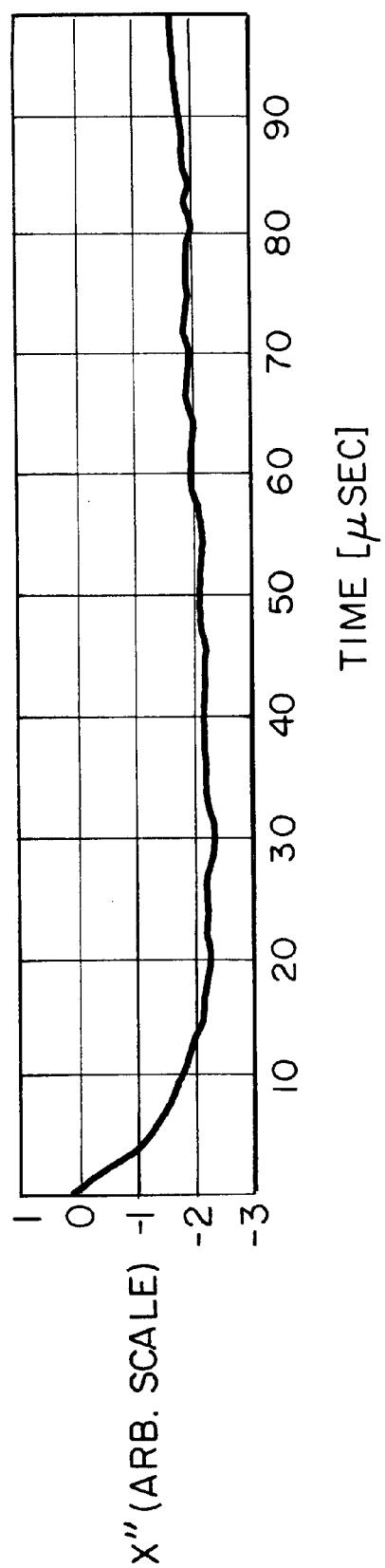
FIG. 3 illustrates a typical experimental curve for the sample magnetization after laser excitation.

Experimental results have been obtained regarding matrix permeability and the anticipated influence on microwave radiation and the expected noise performance of the cavity device shown in FIG. 2. Typical experimental results are shown in FIG. 3, where the time dependence of the matrix magnetization, following a laser pulse, is presented. The first point on the graph corresponds to the thermal magnetization of the free radical, just before light excitation. It can be seen that after laser excitation, a strong magnetization resulting from population inversion is created. This magnetization amounts up to 20 times more than the thermal magnetization of the radical, in negative sign. Induced magnetization can be detected up to several hundreds of $\mu$s (depending on the specific radical used, and solvent properties) from the laser pulse. It should be noted that this entire process is carried out at room temperature. Let us calculate the imaginary permeability generated in the active chemical system in this process. Radical concentration of 2 mM corresponds to $\Delta N$ of ~$10^{15}$ spins in cc, at room temperature (thermal equilibrium) for X-band device (3500 Gauss). Due to the RTPM effect, we have currently presented a $\Delta N$ of $\sim 2\times10^{16}$ spins/cc. A radical with a line width of 1 MHz, corresponds to spin-spin relaxation time, $T_2$, of the radical of $2/\Delta\omega = 3.18\times10^{-7}$ (for a Lorentzian line shape). This means that $f(\omega-\omega_0)$ in eq 4 is $T_2/\pi = 10^{-7}$ at it maximum. Inserting all values and constants, in cgs units, into eq 4 results in $\kappa'' = 1.4\times10^{-3}$, which means that the imaginary permeability will be $\sim 0.017$. We can now relate such permeability to the electromagnetic radiation in an apparatus such as that presented in FIG. 2, via eq 5 (Feher):

$$\frac{\Delta P_c}{P_0} = \pm 0.193 \times 4\pi \times \kappa'' \eta Q_0 \quad (5)$$

Where $\Delta P_c$ is the reflected power from the cavity (due to sample absorption/amplification), $P_0$ is the power incident on the cavity, $\eta$ is the filling factor of the cavity, which is $\sim 0.1$ and $\sim 0.5$ for configuration a and b, respectively (FIG. 1). $Q_0$ is the quality factor of the cavity, which can be adjusted to fit the bandwidth of operation. This equation predicts the change in the reflected microwave power due to the existence of paramagnetic sample in the cavity (this is related to the reflection coefficient of the cavity). For a 1 MHz bandwidth of operation, at 10 GHz, $Q_0$ can be as high as 10,000. However, a more practical values for $Q_0$ is about 1,000. Considering all these factors it can be shown that $\Delta P_c/P_0$ is calculated to be the order of 1, depending on the specific cavity configuration employed. This means that the reflected microwave radiation is strongly affected by the matrix in the cavity, which results in an amplitude and/or phase shift of the incident radiation, as the reflection coefficient of the cavity changes considerably.

It is known (Yariv) that generating stimulated radiation in a $S=\frac{1}{2}$ system, the following condition must be fulfilled:

$$\Delta N \geq \frac{h}{4\pi Q \eta \mu_B^2 T_2}$$

where $\mu_B$ is the Bohr magneton (the other parameters are defined earlier). With these values, we obtain that $\Delta N$ must be larger than $3\times10^{16}$ for the configuration of FIG. 2a or $6\times10^{15}$ for the configuration of FIG. 2b. These values correspond to the values of $\Delta N$ obtained experimentally as described above. As to the predicted noise performance of such a device, it can be approximated for a reflection cavity (Orton el al) by:

$$T_m = \frac{1}{1-\lambda}(\lambda T_\lambda - |T_s|)$$

where $\lambda$ represents the losses in the transmission line from the source to be amplified to the cavity, $T_\lambda$ is the ambient temperature of the transmission line and $T_s$ is the spin temperature which depends upon the amount of deviation from thermal population of the spin levels. By a careful design and placing the cavity as close as possible to the source (for example, the antenna), one can obtain that $\lambda \sim 0.1$. Such a figure implies that for a population difference 20 times more than the Boltzmann population (which corresponds to a spin temperature of $\sim 15$ K) an overall noise temperature of 50 K is achieved in this device at room temperature. Of course, for ultra low noise performance, one must decrease $\lambda$ to be as small as possible and then a noise temperature of even less than 10 K, with improved active materials, could be achieved, at room temperature.

The non-linear properties of the cavity device also deserve comment. The foregoing mathematical treatment is based on the assumption that the incident microwave power is small enough not to perturb the spin levels population. In practice, for strong microwave signal, spin population will be affected and the device will exhibit non-linear properties. In the case of a strong microwave pulse entering the cavity, whose duration is much smaller than the spin lattice relaxation time of the radical, if the number of photons in the pulse is in the order $\Delta N$, then the device spin levels will be saturated with resultant loss of permeability. Taking a device which resembles the prototypes shown in FIG. 2, the matrix volume is 0.015–0.2 cc, depending on the configuration. This will result in maximal pulse of $3\times10^{14}$ to $4\times10^{15}$ photons, which is for X-band radiation, about $2\times10^{-9}$ to $2.6\times10^{-8}$ J/pulse. A typical pulse of 1 $\mu$s, with a power of 1–20 mW will thus saturate the device.

The microwave devices of this invention are based upon the electron spin polarization effect generated in a chemical matrix by photoexcitation:

1. Amplification of low power microwave signal with very low additional noise. Due to the fact that the spin population is inverted by the light excitation through the radical triplet pair mechanism (RTPM), the chemical matrix system can increase the microwave radiation in the cavity 14 through stimulated emission. Thus, the radiation reflecting back from the cavity 14 can be amplified. Due to its noise temperature, which is directly related to the spin temperature, such an amplifier as shown in FIG. 5 has a very low-noise figure, which can be very low in the order of $\sim 10$ K (Hsu et al). It is important to emphasize that the use of optical pumping in conjunction with the RTPM process enables us to achieve such low spin temperature at ambient room temperatures (Hsu et al). In FIG. 5, the microwave generator 24 is coupled to the iris 22 of cavity 14 by circulator 26. A detector 28 is also coupled to circulator 26 to detect amplitude or phase.

2. Low loss phase shifter. In addition to the amplitude change of the reflected microwave fields, there is also a considerable change in their phase. This phase change is also related to the permeability of the active material 10 in the cavity 14 of FIG. 5. The phase shifting of the reflected wave can be controlled easily by changing the light excitation magnitude, and thus changing the active material's permeability. This can be measured by detector 28.

Figure 4:
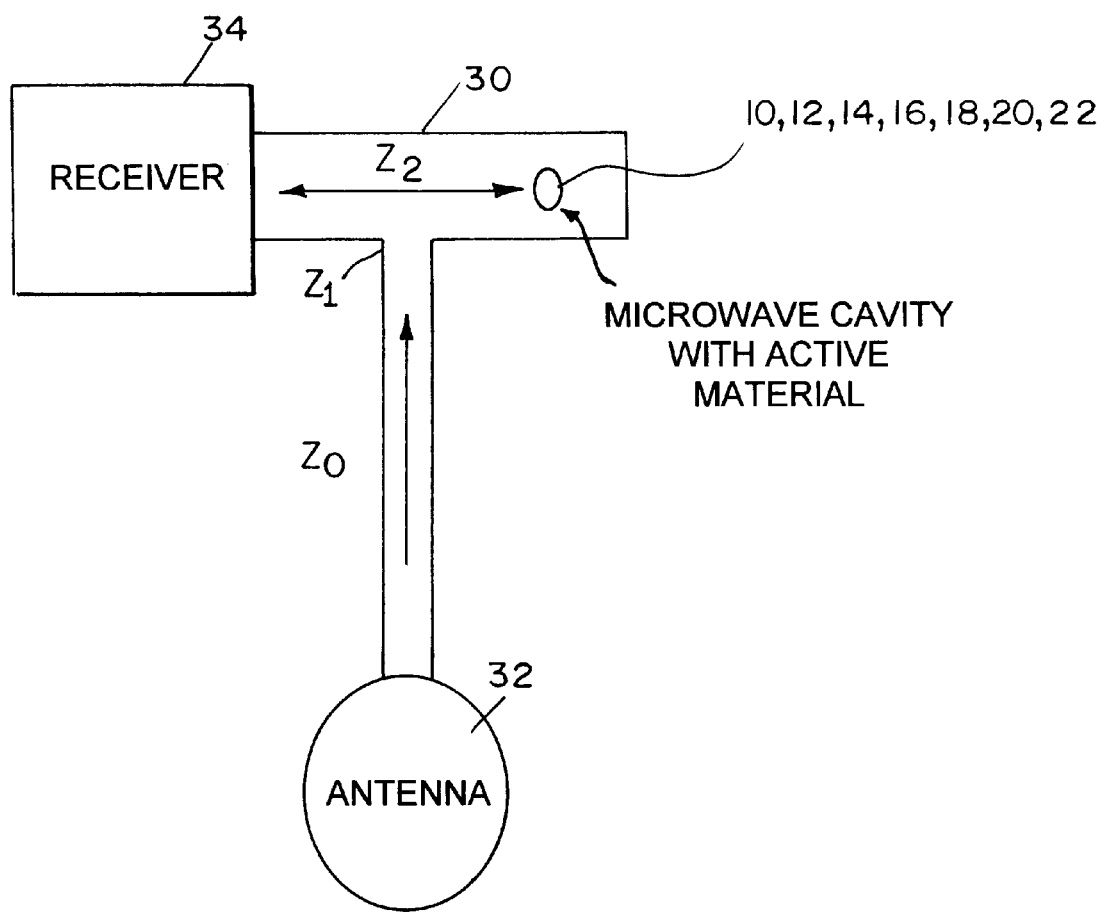
FIG. 4 illustrates a schematic of an ELD device according to the invention.

3. Electromagnetic limiting devices (ELD), which protects sensitive receivers from strong microwave pulses. An additional important property, which is related to the electron spin polarization effect, is the fast saturation of the energy levels by relatively weak electromagnetic irradiation of $\sim 1$ mW (discussed above). Such a low value meets with the requirements of an electromagnetic limiting device, which protects sensitive receivers from undesired strong electromagnetic signals. The schematic diagram shown in FIG. 4 demonstrates such a device, where the active material system 10, 12, 14, 16, 18, 20, 22 is positioned in the microwave waveguide junction 30 between the antenna 32 and the receiver 34. Antenna 32 is the equivalent of the microwave source 24 in the other drawing, and receiver 34 is equivalent to the detector 28. In normal operation, the signal (due to the matrix material's permeability) which arrives to the junction 30 enters the receiver 34. However, when a strong EM signal arrives, it saturates the active material's energy levels, which makes it transparent ("inactive") in terms of its electromagnetic properties and causes the signal to avoid the receiver.

4. Schematic presentation of the proposed ELD device. The signal from the antenna is reflected from the waveguide junction with a reflection coefficient amplitude, equations i and ii, inserted). $Z_0$ is the waveguide's impedance, $Z_1$ is the impedance at the junction, and $Z_2$ is the impedance at the entrance to right branch of the junction. When the active material is not saturated, the phase difference between the waveguide's wall at the end of the right branch to the junction causes $Z_2$ to be infinite and the entire signal should enter the receiver. When strong EM signal saturates the active material, no phase is added to the signal. Thus, $Z_1$ and $Z_2$ are zero and the signal is reflected from the junction.

Possible applications of the proposed devices

It is anticipated that low noise amplifiers (LNA) constructed in accordance with this invention could operate in satellite communication instrumentation, radio telescopes, etc, in a manner which can save up to 2–3 dB in signal-to-noise ratio with respect to today's LNAs operating at room temperature. These results are of great importance for the cellular and satellite communication industries, as they could substantially improve the area which the satellite or cellular receiver can cover. For example, a 1 dB improvement in cellular station receiver would increase the radius of coverage by 12% or the area by about 25%. This could result in substantial savings of funds for the coverage of large area with large number of base stations (up to 25% of savings).

APPENDIX

References

U.S. Pat. No. 3,736,518 May 1973 Anderson, C., Feingold, B., Sabisky, E. "Masers Incorporating Crystal having F-Centers,".

Other Publications

Blättler, C., Jent, F., Paul, H., "A Novel Radical-Triplet Pair Mechanism for Chemically Induced Electron Polarization (CIDEP)," Chemical Physics Letters, 166 (1990) 375.

Blank, A., Kastner, R., Levanon., H., "Exploring New Active Materials for Low-Noise Room-Temperature Microwave Amplifiers and Other Devices," IEEE Transactions on Microwave Theory and Techniques, 46 (1998) 2137.

Blank A. and Levanon H., "Triplet Radical Interaction. Direct Measurement of Triplet Polarization Transfer by Fourier-Transform Electron Paramagnetic Resonance", Journal of Physical Chemistry A 104 (2000) 794–800.

Blank A. and Levanon H., "On the Mechanisms Interaction between Triplets and Doublets in Liquid Solution" to be submitted to J. Phys. Chem. A.

Feher, G. "Sensitivity Considerations in Microwave Paramagnetic Resonance Absorption Techniques," The Bell Systems technical Journal, 36, (1957) 449.

Glass, D., Johnson, L., Ortiz, G., "X-band ultra low-noise maser amplifier performance," In. Proceedings of the symposium on Low Temperature Electronics and High Temperature Superconductivity. Vol. 93-22 (Ed. Seider, SI) Electrochemical Society Pennington, N.J., p. 333.

Hsu, H., Tittel, F., "Optical Pumping of Microwave Masers," Proceedings of the IEEE, (1963), 185.

McMillian J. A. In: "Electron Paramagnetism," Reinhold Book Corporation, 1968.

Muus, L., Atkins, P., McLauchlan, K., Pedersen, J., (Eds.) "Chemically Induced Dynamic Magnetic Polarization" Reidel, Dordrecht, 1977.

Orton J., Paxman, D., Walling, J., "The Solid State Maser," 1970 Pergamon Press.

Sabisky, E, Anderson, C. "Solid State Optically Pumped Microwave Masers", IEEE Journal of Quantum Electronics, 3 (1967), 287.

Shushin, A. I., "The relaxational Mechanism of NET CIDEP Generation in Triplet-Radical Quenching," Chem. Phys. Lett. 208, (1993), 173.

Thomas, B., Schafer, J., Sinclair, M., Kesteven, M., Hall, P., "The Parkes Radio Telescope Modified for Rapid Receiver Changes," IEEE Antennas and Propagation Magazine, 39, (1997) 54.

Wittke, J., "Molecular Amplification and Generation of Microwaves," Proceedings of the IRE, 45, (1957) 291.

Yariv A. In: "Quantum Electronics" Wiley, N.Y., 1967.

The electromagnetic limiting devices have many applications in military context, mainly the protections of radar and communication installation from electromagnetic warfare.

What is claimed is:

1. A room temperature optically pumped solid state maser device comprising:

a magnetic field;

an optical pump;

a chemical system including a quantity of chromophore and a stable radical species in an optically transparent matrix, the chemical system being in the magnetic field and produces high magnetic permeability by radical triplet pair mechanism when subjected to optical pumping.

2. A device according to claim 1 wherein the chromophore is selected from the group consisting of $H_2TPP$ and etioporphyrin I.

3. A device according to claim 2, wherein the radical species is selected from the group consisting of galvinoxyl, BDPA, and trityl.

4. A device according to claim 1, wherein the optically transparent matrix is a solvent selected from the group consisting of dichloromethane and paraffin oil.

5. A device according to claim 1, wherein the optical pump produces enough photons to excite substantially the entire quantity of chromophore.

6. A device according to claim 1, wherein the concentration of the chromophore and radical species in the chemical system are substantially equal.

7. A device according to claim 1, wherein the magnetic field is produced by a combination of a permanent magnet and an electromagnet.

8. A device according to claim 1, wherein the chemical system produces a device having a band width in the range of 1M Hertz to 10M Hertz.

9. A device according to claim 1, wherein the optical pump produces pulses of pumping radiation and the chemical system changes permeability for a period of as much as 100 microseconds after the pulse of pumping radiation terminates.

10. A device according to claim 1, wherein the chemical system is sealed in a quartz container.

11. A device according to claim 1, wherein the chemical system is sealed in an optically opaque dielectric material with a light aperture.

12. A device according to claim 1, wherein the device is a microwave amplifier.

13. A device according to claim 12, wherein the chemical system having a low spin temperature to produce a noise temperature in the order of $10°$ K.

14. A device according to claim 1, wherein the device is a phase shifter.

15. A device according to claim 1, wherein the device is an electro-magnetic limiting device.

16. An apparatus for modifying a microwave signal
- a dielectrically shielded cavity having at least one light aperture;
- a spin polarization matrix in the shielded cavity, said matrix comprising a stable free radical species and a light inducible paramagnetic triplet precursor chromophore in energy transfer communication with said free radical species;
- a magnet for applying a substantially homogenous magnetic field to the matrix in the shielded cavity;
- a light source for irradiating the matrix through the light aperture in the cavity to generate radical triplets from said chromophore; and
- a wave guide element for directing microwave signals to and from said cavity.

17. The apparatus of claim 16 wherein the light source is a source of visible light.

18. The apparatus of claim 16 or 17 wherein the matrix further comprises an optically transparent fluid medium.

19. The apparatus of claim 17 wherein the light source is a laser.

20. The apparatus of claim 19 wherein the laser is a pulsed laser.

21. The apparatus of claim 18 wherein the fluid medium comprises a liquid crystalline polymer composition.

22. The apparatus of claim 18 wherein the fluid medium comprises an organic solvent and a solvent miscible oil.

23. The apparatus of claim 16 wherein the chromophore is in crystalline form and the free radical is dispersed in the chromophore crystal.

24. The apparatus of claim 16 wherein the magnet comprises a permanent magnet.

25. The apparatus of claim 16 wherein the magnet comprises an electromagnet.

26. The apparatus of claim 16 wherein the magnet comprises a permanent magnet and an electromagnet.

27. The apparatus of claim 16 wherein the matrix comprises a predetermined molar equivalent amount of the chromophore species and the light source is a pulsed light source capable of delivering in each pulse a number of photons equivalent to the number of chromophore species in the matrix.

28. The apparatus of claim 27 wherein a molar amount of the stable free radical in the matrix is substantially equivalent to the amount of chromophore species in the matrix.

29. A low noise microwave amplifier in accordance with claim 16.

30. A low loss microwave phase shifter in accordance with claim 16.

31. A microwave limiting device in accordance with claim 16.

* * * * *